United States Patent [19]

Starr

[11] Patent Number: 6,026,059
[45] Date of Patent: Feb. 15, 2000

[54] METHOD OF CREATING COMMON-OFFSET/COMMON-AZIMUTH GATHERS IN 3-D SEISMIC SURVEYS AND METHOD OF CONDUCTING REFLECTION ATTRIBUTE VARIATION ANALYSIS

[75] Inventor: Joel Starr, Richmond, Tex.

[73] Assignee: Petroleum Geo-Services (US), Inc., Houston, Tex.

[21] Appl. No.: 08/970,674

[22] Filed: Nov. 14, 1997

[51] Int. Cl.$^7$ .................................................. G01V 1/04
[52] U.S. Cl. ................... 367/72; 367/56; 367/58
[58] Field of Search ................................ 367/52, 53, 72, 367/56, 58, 38, 59

[56] References Cited

U.S. PATENT DOCUMENTS

| | | | |
|---|---|---|---|
| 4,241,429 | 12/1980 | Bloomquist et al. | 367/52 |
| 4,742,497 | 5/1988 | Beasley et al. | 367/53 |
| 4,797,861 | 1/1989 | Beasley | 367/72 |
| 4,980,866 | 12/1990 | Wang et al. | 367/52 |
| 5,402,391 | 3/1995 | Cordsen . | |

FOREIGN PATENT DOCUMENTS

726307   1/1966   Canada .

*Primary Examiner*—Christine K. Oda
*Assistant Examiner*—Anthony Jolly
*Attorney, Agent, or Firm*—Arnold & Associates

[57] ABSTRACT

Processes are described for providing a data set useful for performing analysis of reflection attribute variation among traces in a window of three-dimensional seismic data, wherein the traces have a reflection point assigned thereto and wherein the traces represent recordings from shot-receiver pairs having various azimuth angles. According to one embodiment, the process comprises: assigning an offset value to a plurality of traces; fitting a substantially conical surface having a major and a minor axis to the data of the traces within the window, wherein: the major axis of the cone represents the azimuth direction having the lowest variation in the reflection attribute, and the minor axis of the cone represents the azimuth direction having the highest variation in the reflection attribute; assigning a coordinate set to the surface, wherein the coordinate set is related to a survey geometry of the data; and comparing the reflection attribute variation as a function of offset and azimuth.

43 Claims, 8 Drawing Sheets

METHOD OF CREATING COMMON-OFFSET/COMMON-AZIMUTH GATHERS IN 3-D SEISMIC SURVEYS AND METHOD OF CONDUCTING REFLECTION ATTRIBUTE VARIATION ANALYSIS

BACKGROUND OF THE INVENTION

This invention relates to the field of seismic signal processing, and specifically to the area of three dimensional seismic signal processing.

In performing traditional two dimensional seismic data processing on multiple fold data, common mid-point ("CMP") gathers are made. In comparing the traces in the gather, the offset (distance between the source and receiver) of the traces varies. Further, in comparing the gather of one mid-point to the gather of another midpoint, the number of traces and the offset variation is substantially the same. Most differences occur due to the need to remove an obviously bad trace from the data set. However, in high fold data, such blanking is not appreciable.

Figure 1:
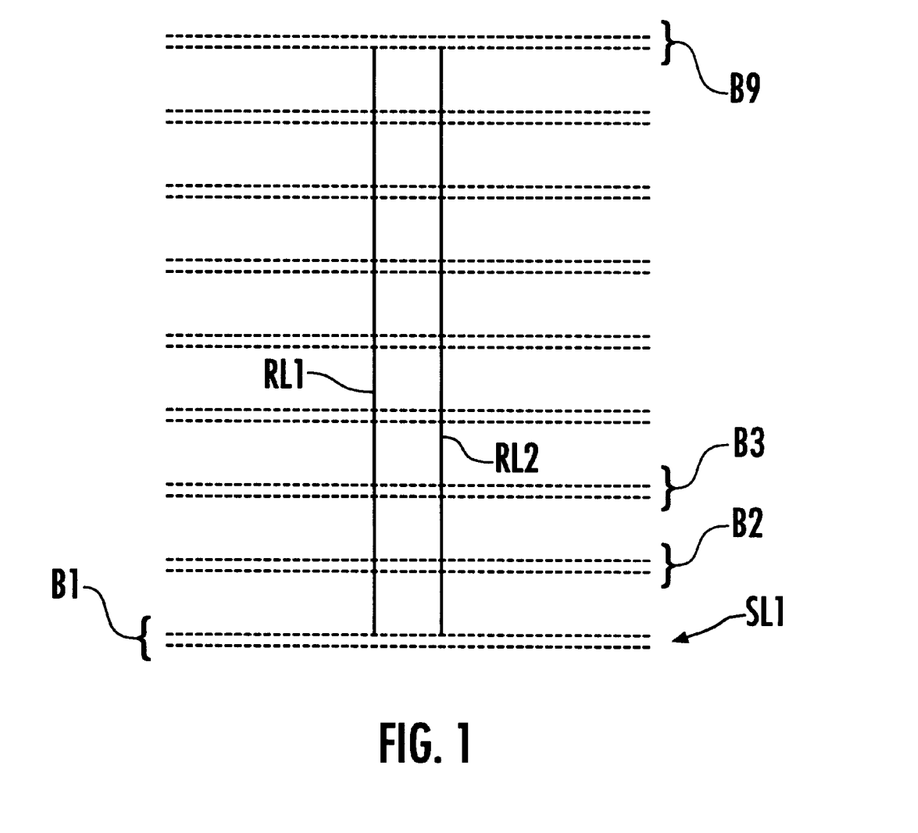
FIG. 1 is a representational view of an example survey for acquisition of seismic data.

In performing three dimensional analysis, rather than common mid-point gathers, common mid-point bins are made of the data, which include traces having a common midpoint, and various offsets from ray traces having traveled cross-line. Such bins might have consistent fold, but uniform offset distribution does not exist. For example, as seen in FIG. 1, a typical acquisition geometry for ocean-bottom prospecting is seen, in which two receiver lines RL1 and RL2 are laid out parallel to each other. Sail Lines are shot orthogonal to the receiver lines at regular intervals (SL1).

Figure 2:
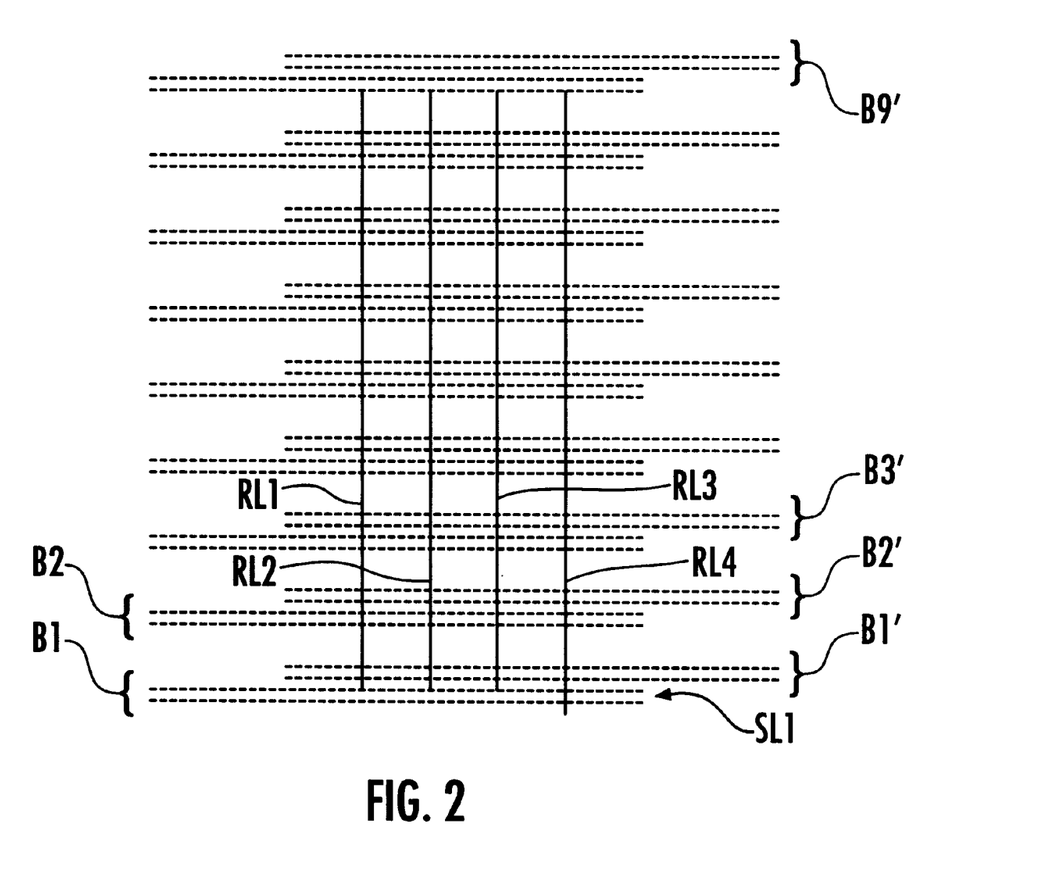
FIG. 2 is a representational view of an example survey for acquisition of seismic data.
Figure 3:
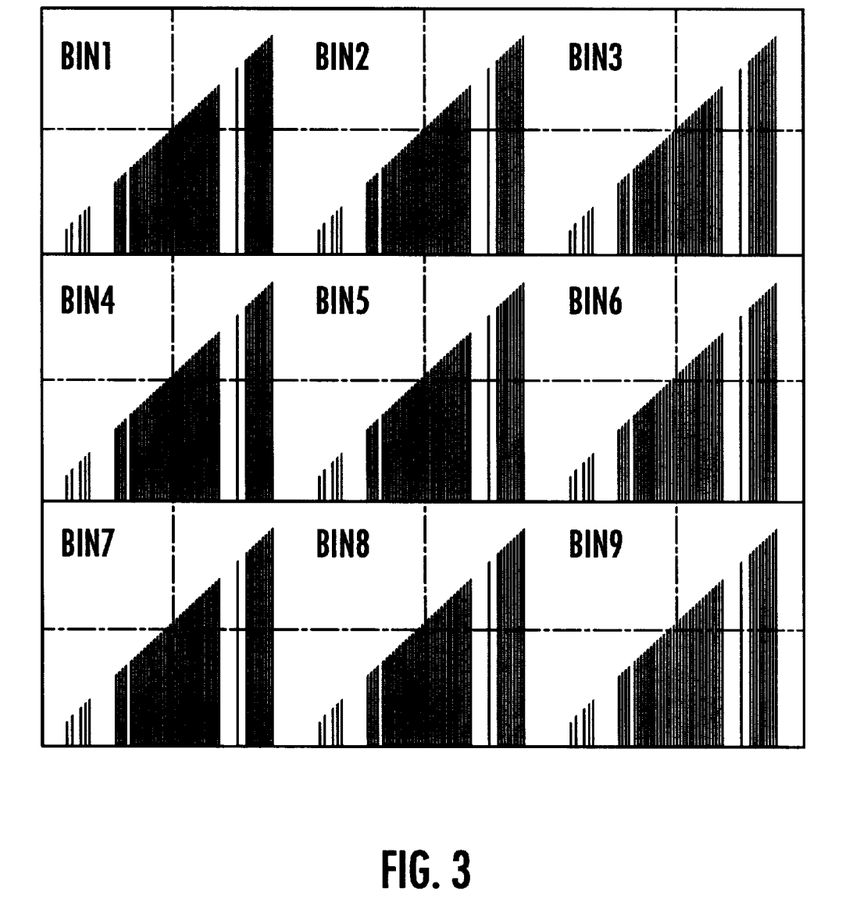
FIG. 3 is a plot of traces in bins formed from the survey of FIG. 2.

Referring now to FIG. 3, nine common-midpoint bins (BIN 1–BIN 9) from the survey geometry of FIGS. 1 and 2 are shown, in which each line within the bin represents a trace, the vertical and horizontal axes are offset. Here, it is seen that the offset distribution is not uniform. This pattern is dependent upon the acquisition geometry, and this non-uniform pattern has not been found to be avoidable. Changing the acquisition geometry to accommodate offset distribution in the common mid-point bins is not practical.

Figure 4:
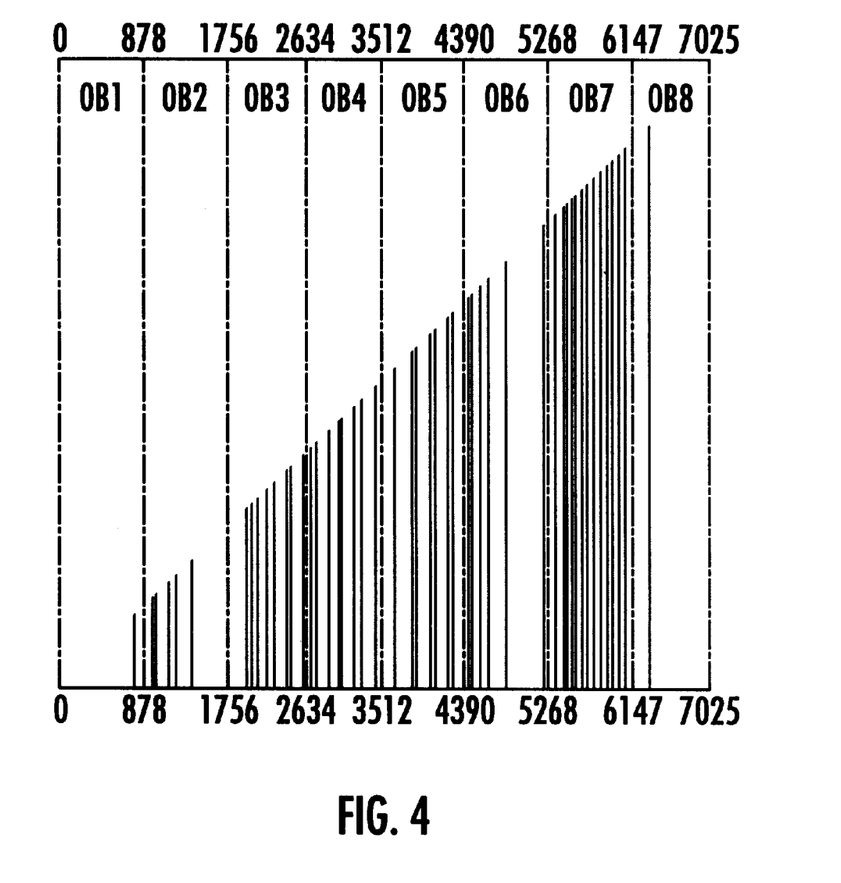
FIG. 4 is a plot of one of the bins of FIG. 3.

In some forms of analysis, the variation of trace attributes as a function of offset or angle of reflection is of interest (e.g., AVO, AVA, and other offset-dependent-reflectivity analysis). However, as seen in FIG. 4, where one of the offset bins of FIG. 3 is seen divided into multiple offset bins OB1–OB8, the offset is so non-uniform that offset bins OB1 includes only one trace and bin OB7 contains thirteen. When the traces within the offset bins are stacked, the large variation detrimentally affects the analysis. This occurs because the variations created in normalizing the amplitude and noise components of the data, after stacking such non-uniform fold, influences one of the very attributes to be studied—amplitude.

Accordingly, there is a need for a method of providing common-offset bins, within a common mid-point bin, which are uniform in distribution.

In conducting amplitude variation with offset analysis ("AVO") and amplitude variation with angle analysis ("AVA"), in three dimensional data sets, it is common to analyze the amplitude in a CMP only relative to offset, in a two-dimensional fashion, and assign a value or slope to the variation within that bin. No azimuth or directional information is preserved that would indicate the trend of variation within the bin. Therefore, amplitude variation trends across a 3D survey are not conducted, and there is a need for a method of conducting AVO and/or AVA analysis in which trend information within the survey bins is available.

SUMMARY OF THE INVENTION

It is an object of the present invention to address the above problems.

Therefore, according to one aspect of the invention, a method is provided

A process for generating a bin of common mid-point traces from a three dimensional seismic survey data set, each of the traces having a shot location and a receiver location associated therewith, the process comprising:

gathering from the data a plurality of traces having a common reference point, whereby a common reference point bin is defined and whereby each of the plurality of traces has an offset associated therewith;

assigning a coordinate set to a plurality of traces in the common reference point bin, wherein the coordinates are associated with the shot position and the receiver position associated with the traces and wherein, from the coordinates, the offset and direction of a line between the shot and receiver is determinable, whereby a coordinate-designated set of traces is defined; and organizing the coordinate-designated set of traces into a set of bins having a regularized number of traces.

A process for generating a bin of common mid-point traces from a three dimensional seismic survey data set, each of the traces having a shot location and a receiver location associated therewith, the process comprising:

gathering from the data a plurality of traces having a common mid-point, whereby a common mid-point bin is defined and whereby each of the plurality of traces has an offset associated therewith;

assigning a Cartesian coordinate set, having a first axis parallel to a receiver line and a second axis parallel to a shot line, to a plurality of traces in the common mid-point bin, wherein the coordinates are associated with the shot position and the receiver position associated with the traces and wherein, from the coordinates, the offset and direction of a line between the shot and receiver is determinable, whereby a coordinate-designated set of traces is defined, wherein a plurality of the coordinate-designated set of traces have the same coordinates; and adding a plurality of traces having the same coordinates.

A process for providing a data set useful for performing analysis of a reflection attribute of traces in a window of three-dimensional seismic data, the process comprising:

binning the traces into common reference point bins, wherein the traces in the common reference point bins represent recordings from shot-receiver pairs having various azimuth angles;

fitting a surface to the data of the binned traces within the window, assigning a coordinate set to the surface, wherein the coordinate set is related to a survey geometry of the data.

A process for providing a data set useful for performing analysis of reflection attribute variation among traces in a window of three-dimensional seismic data, wherein the traces have a reflection point assigned thereto and wherein the traces represent recordings from shot-receiver pairs having various azimuth angles, the process comprising:

assigning an offset value to a plurality of traces;

fitting a substantially conical surface having a major and a minor axis to the data of the traces within the window, wherein:

the major axis of the cone represents the azimuth direction having the lowest variation in the reflection attribute, and the minor axis of the cone represents the azimuth direction having the highest variation in the reflection attribute;

assigning a coordinate set to the surface, wherein the coordinate set is related to a survey geometry of the data; and comparing the reflection attribute variation as a function of offset and azimuth.

DESCRIPTION OF THE DRAWINGS

For a more complete understanding of the present invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

Detailed Description of Example Embodiments of the Invention

Figure 5:
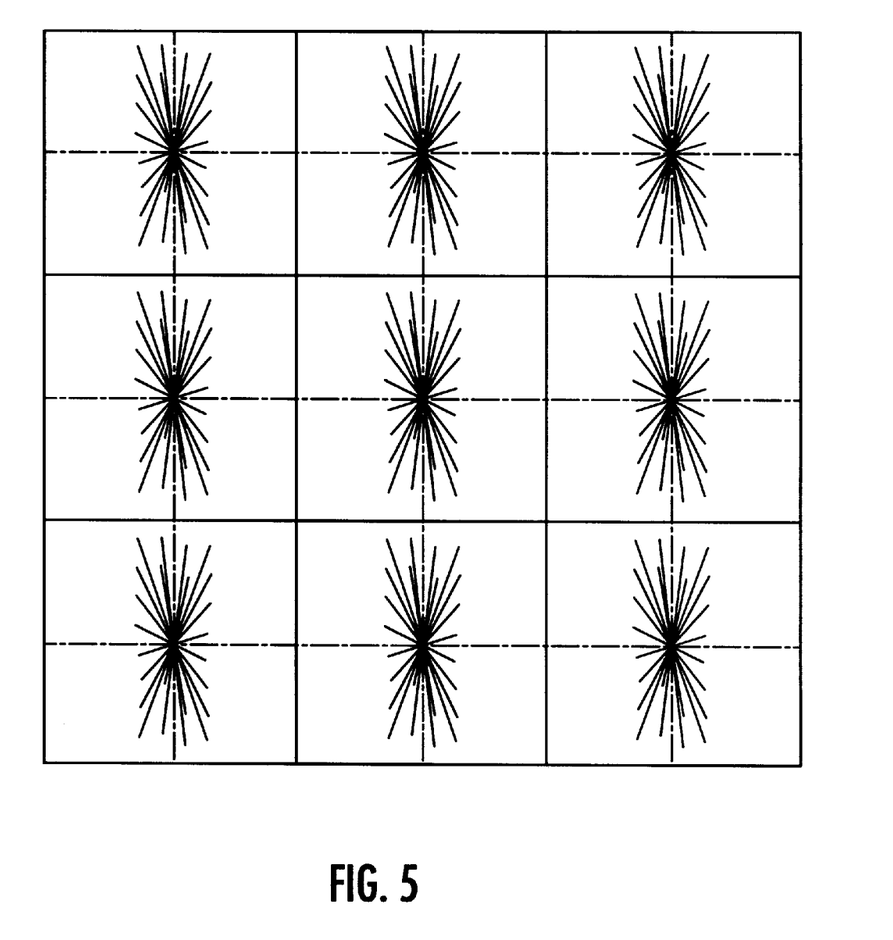
FIG. 5 is a set of spider diagram plots of traces in bins from the survey of FIG. 2.
Figure 6:
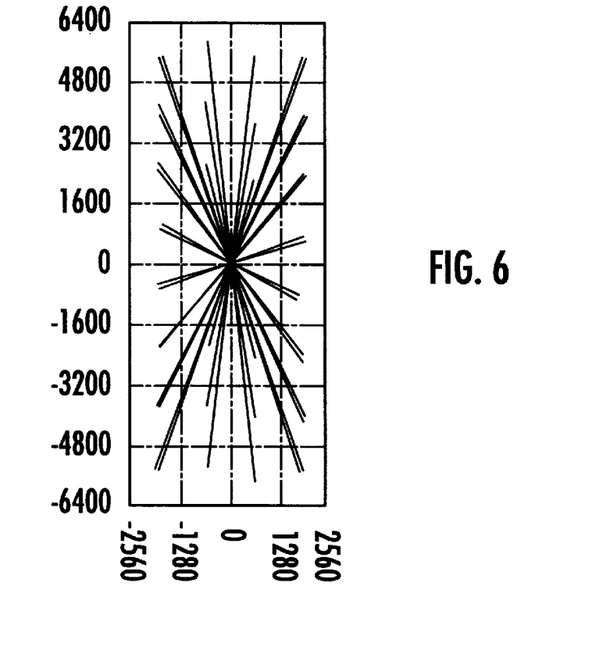
FIG. 6 is a view of one of the spider diagram plots of FIG. 5.

According to one aspect of the present invention, a process is provided for generating a bin of common midpoint traces from a three dimensional seismic survey data set, each of the traces having a shot location and a receiver location associated therewith The process comprises gathering from the data a plurality of traces having a common mid-point, whereby a common mid-point bin (e.g. any of bins BIN 1–BIN 9 of FIG. 3) is defined and whereby each of the plurality of traces has an offset associated therewith. In FIG. 5, each of the traces of FIG. 3 is shown in a spider diagram, in which the offset and azimuth associated with each trace is displayed. The offset is represented by the length of the line representing the trace, and the azimuth is represented by the angle of the line. As seen in FIG. 6, which shows one of the CMP bins of FIG. 5, a coordinate set is assigned to the traces in the CMP bin. In this example, there is a constant fold of two traces per coordinate bin. Thus, from the coordinates assigned, the offset and direction of a line between the shot and receiver is determinable, and a coordinate-designated set of traces is defined.

In the example embodiment shown, a plurality of the coordinate-designated set of traces have the same coordinates. In this example, the acquisition geometry resulted in two traces populating each common-inline/common-crossline bin, and, according to a further embodiment of the invention, such traces are added to increase the signal to noise ratio. However, in alternative embodiments, there will be a unique set of coordinates per trace (i.e. a single trace per coordinate bin), and no adding will occur. It should also be noted that, in the example of FIG. 6, a Cartesian set of coordinates is assigned. However, other sets of coordinates are also acceptable, depending upon the pattern and fold of the CMP bin.

Figure 7:
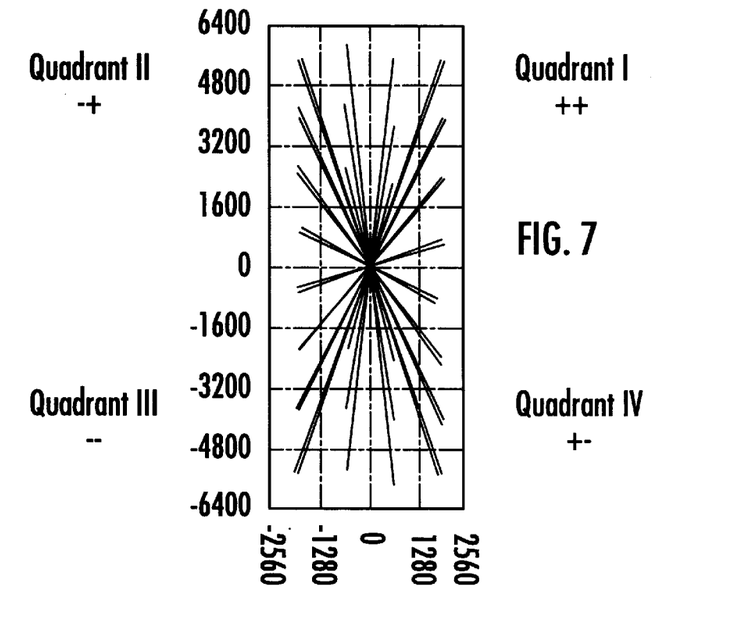
FIG. 7 is a spider diagram plot of FIG. 5, divided into quadrants.
Figure 8:
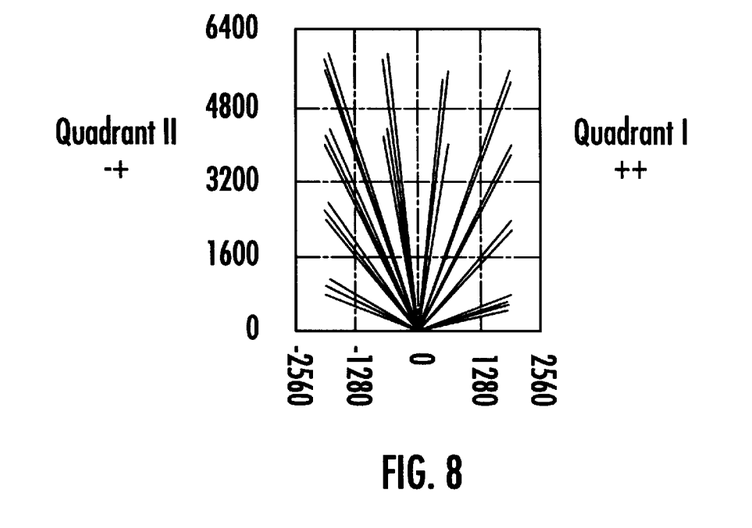
FIG. 8 is a spider diagram plot of FIG. 5, wherein opposing plots are added.

Referring now to FIG. 7, the coordinate bin of FIG. 6 is divided into four quadrants (I–IV). It has been found that the raypaths for opposing quadrants I and III and quadrants II and IV are the same for many acquisition geometries. In a geometry as illustrated, the source and receiver locations are reversed for opposing quadrants. Accordingly, in one embodiment of the invention, as seen in FIG. 8, the Cartesian bin is folded such that opposing quadrants are added, and common inline/crossline coordinate bins are produced, having an increased fold (here, four). It will be understood that in one embodiment of the invention, the Cartesian coordinates have a first axis parallel to a receiver line and a second axis parallel to a shot line; while, according to an alternative embodiment, the Cartesian coordinates have a first axis parallel to a shot line and a second axis parallel to a receiver line.

According to a further aspect of the present invention, a process is provided for generating a data set useful for performing analysis of reflection attribute (e.g. amplitude, frequency, phase) variation among traces. According to this aspect, it has been found that reflection attributes for the same reflection point vary, depending upon the raypath being detected. In some embodiments, the variation is analyzed by comparing the variation to the offset between the shot and the receiver detecting the reflection event; while, in other embodiments, the variation is compared as a function of the reflection angle at the event In any case, on seismic data, thought to be reflected from the same location in the subsurface. In fact, the seismic data represents different offsets or angles of incidence. In such a point in one volume, the traces have a common reference assigned to them, and the traces represent recordings from shot-receiver pairs having various azimuth angles. Therefore, according to one embodiment of this aspect of the invention, the process comprises: fitting a surface to the data of the traces within the window and assigning a coordinate set to the surface, wherein the coordinate set is related to a survey geometry of the data. It has been found that a first order interpolation of the reflection attribute variation among the data is sufficient for many applications, although higher order interpolations will also suffice.

Figure 9:
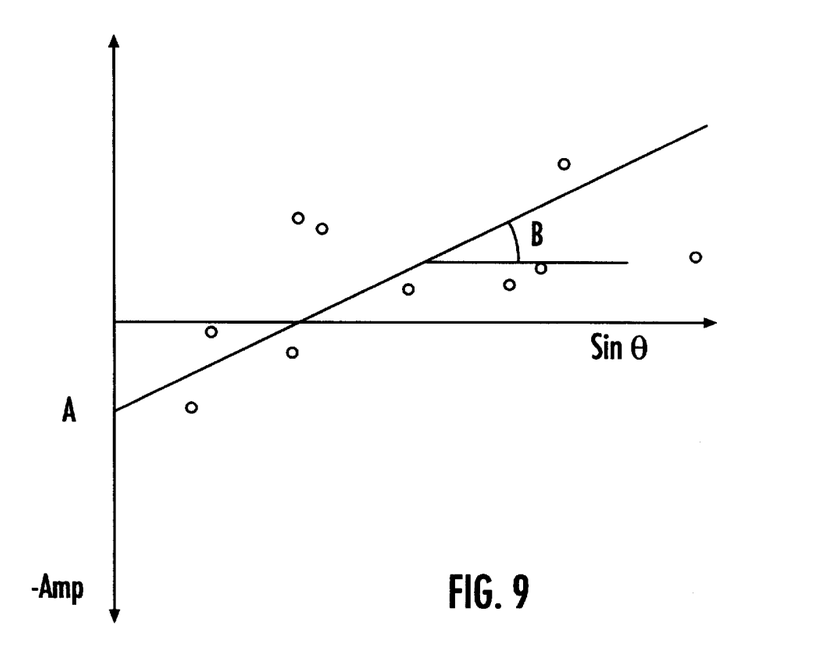
FIG. 9 is a plot of data.

Referring now to FIG. 9, as known in the art of two-dimensional AVA analysis, a "best fit" line can be calculated having a y-axis of amplitude of traces within a window, an x-axis of angle of reflection, and a slope, representing the variation of amplitude with angle of incidence. To date, however, three-dimensional AVA or AVO analysis has not been useful, due in part to the lack of ability to provide azimuth information and to reduce the inconsistency in fold. According to one embodiment of the present invention, however, three-dimensional analysis is made possible.

Figure 10:
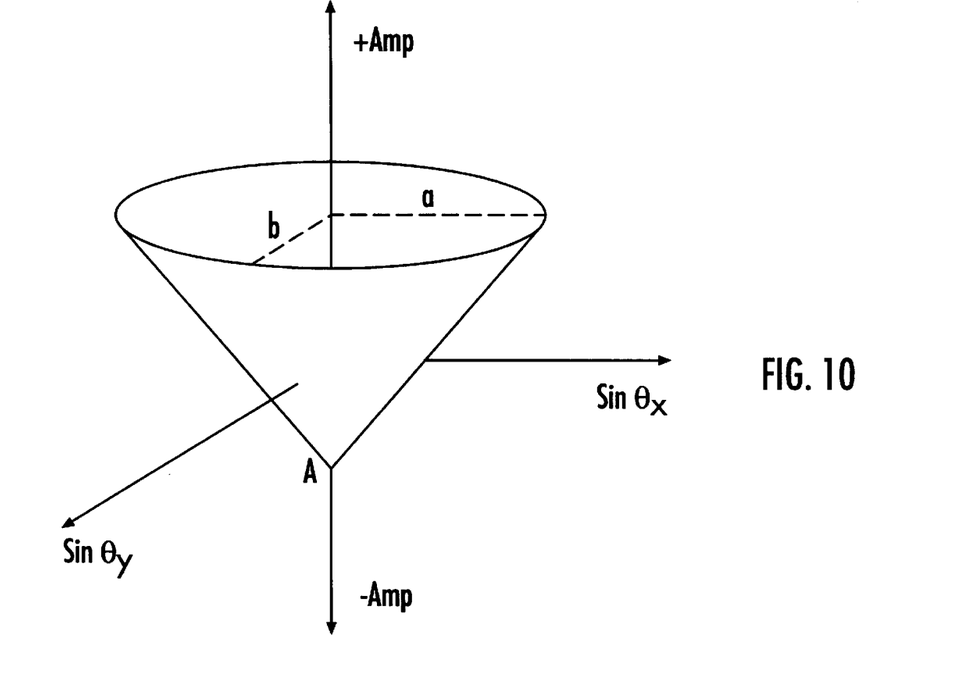
FIG. 10 is a plot of representational data
Figure 11:
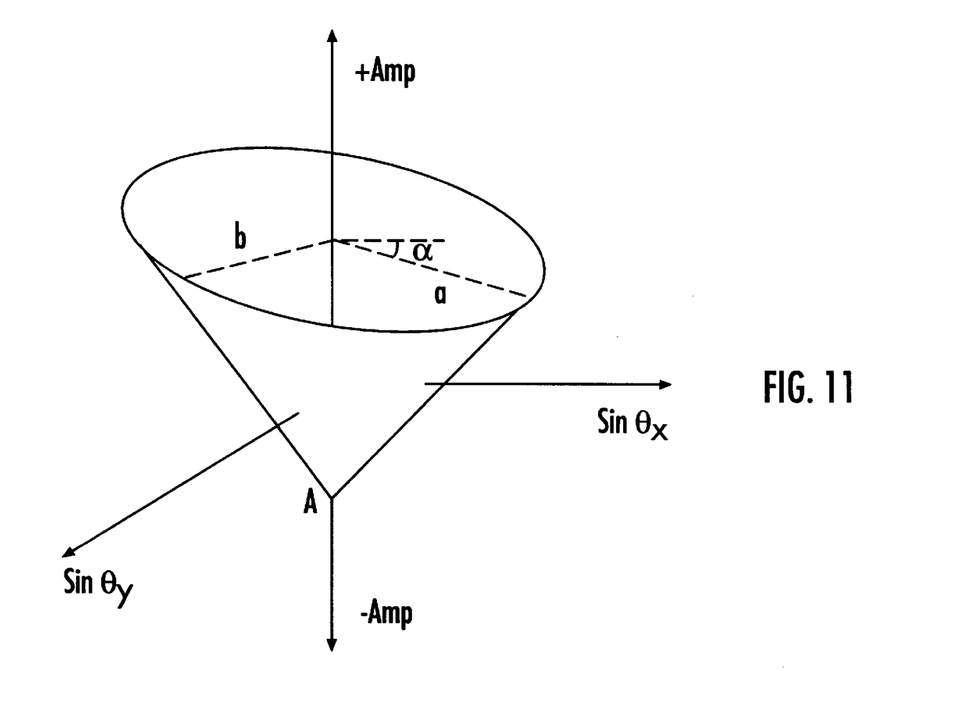
FIG. 11 is a plot of representational data

As seen in FIG. 10, a first order approximation of a surface fit to the amplitude of traces in the bin of FIG. 8 is a cone, using a non-linear least squares algorithm. In cases in which there is an anisotropic effect to the amplitude response, the cone will be distorted into an elliptical cone, having a semi-minor axis "a" and a semi-major axis "b" (FIG. 11). According to this embodiment, the semi-major axis is aligned with the azimuth of minimum gradient, and the semi-minor axis is aligned with the azimuth of maximum gradient. Therefore, FIG. 11 is an example in which the major axis of the cone represents the azimuth direction having the lowest gradient in the reflection attribute, and the minor axis of the cone represents the azimuth direction having the highest gradient in the reflection attribute. In alternative embodiments, this convention is reversed. Further, it should be noted that in one embodiment of the process just described, the common reference comprises a common mid-point; while, in embodiments in which dip-moveout or migration algorithms are applied, the common reference comprises a common-reflection point.

In any case, according to a further aspect of the invention, offset values which have been assigned to a plurality of traces, and the reflection attribute variation between traces in the window are compared as a function of offset and azimuth. Again, in one example, the reflection attribute comprises amplitude. However, in other embodiments, frequency and/or phase is the reflection attribute under analysis. According to still further embodiments, instantaneous amplitude, instantaneous frequency, and/or instantaneous phase are viewed as a function of azimuth.

Further still, in some embodiments the amplitude attribute analyzed is p-wave amplitude, while in other embodiments the attribute analyzed comprises s-wave amplitude. Phase and frequency attributes of p-wave and s-waves are analyzed according to still further embodiments.

According to still further embodiments of the invention, the azimuth information made available is used to view trends of reflection attribute behavior across the survey. For example, in one embodiment, the AVO response of CMP bins is compared. Thus, generally stated, a data set of multiple bins of traces is provided, wherein a plurality of traces in the bin have a common reference assigned thereto and wherein the traces represent recordings from shot-receiver pairs having various azimuth angles. A surface is fit to the data of the traces within the window, in each of the bins; a coordinate set is assigned to a plurality of the surfaces; and the surfaces of adjacent bins are tied.

The above embodiments are provided by way of example only, and alternative embodiments will occur to those of skill in the art without departing from the spirit of the invention, as defined by the claims below.

What is claimed is:

1. A process for generating a bin of common mid-point traces from a three dimensional seismic survey data set, each of the traces having a shot location and a receiver location associated therewith, the process comprising:
    gathering from the data a plurality of traces having a common reference point, whereby a common reference point bin is defined and whereby each of the plurality of traces has an offset associated therewith;
    assigning a coordinate set to a plurality of traces in the common reference point bin, wherein the coordinates are associated with the shot position and the receiver position associated with the traces and wherein, from the coordinates, the offset and direction of a line between the shot and receiver is determinable, whereby a coordinate-designated set of traces is defined; and
    organizing the coordinate-designated set of traces into a set of bins having a regularized number of traces.

2. A process as in claim 1 wherein a plurality of the coordinate-designated set of traces have the same coordinates.

3. A process as in claim 2, further comprising adding a plurality of traces having the same coordinates.

4. A process as in claim 1, wherein each trace has a unique set of coordinates.

5. A process as in claim 1, wherein at least two of the coordinate-designated set of traces have different coordinates and are from a common shot-receiver location, and further comprising adding the at least two of the coordinate-designated set of traces.

6. A process as in claim 1 wherein the coordinate set is a Cartesian coordinate set.

7. A process as in claim 6 wherein the Cartesian coordinate set has a first axis parallel to a receiver line and a second axis parallel to a shot line.

8. A process as in claim 6 wherein the Cartesian coordinate set has a first axis parallel to a shot line and a second axis parallel to a receiver line.

9. A process as in claim 6 wherein the Cartesian coordinates set has a first axis parallel to a receiver line and a second axis parallel to a shot line.

10. A process as in claim 1 wherein the common reference point comprises a common midpoint.

11. A process as in claim 1 wherein the common reference point comprises a common reflection point.

12. A process for generating a bin of common mid-point traces from a three dimensional seismic survey data set, each of the traces having a shot location and a receiver location associated therewith, the process comprising:
    gathering from the data a plurality of traces having a common mid-point, whereby a common mid-point bin is defined and whereby each of the plurality of traces has an offset associated therewith;
    assigning a Cartesian coordinate set, having a first axis parallel to a receiver line and a second axis parallel to a shot line, to a plurality of traces in the common mid-point bin, wherein the coordinates are associated with the shot position and the receiver position associated with the traces and wherein, from the coordinates, the offset and direction of a line between the shot and receiver is determinable, whereby a coordinate-designated set of traces is defined, wherein a plurality of the coordinate-designated set of traces have the same coordinates; and
    adding a plurality of traces having the same coordinates.

13. A process for providing a data set useful for performing analysis of a reflection attribute of traces in a window of three-dimensional seismic data, the process comprising:
    binning the traces into common reference point bins, wherein the traces in the common reference point bins represent recordings from shot-receiver pairs having various azimuth angles;
    fitting a surface to the data of the binned traces within the window;
    assigning a coordinate set to the surface, wherein the coordinate set is related to a survey geometry of the data.

14. A process as in claim 13 wherein the surface represents a first order interpolation of the reflection attribute variation among the data.

15. A process as in claim 13 wherein the common reference comprises a common mid-pit.

16. A process as in claim 13 wherein the common reference comprises a common-reflection point.

17. A process as in claim 13 wherein the surface comprises a cone, having a major and a minor axis.

18. A process as in claim 17 wherein the major axis of the cone represents the azimuth direction having the lowest variation in the reflection attribute.

19. A process as in claim 18 wherein the minor axis of the cone represents the azimuth direction having the highest variation in the reflection attribute and wherein the length of the semi-major axis is different from the length of the semi-minor axis.

20. A process as in claim 13 further comprising:
assigning an offset value to a plurality of traces and
comparing the reflection attribute variation as a function of offset and azimuth.

21. A process as in claim 20 wherein the reflection attribute comprises amplitude.

22. A process as in claim 21 wherein the reflection attribute comprises p-wave amplitude.

23. A process as in claim 21 wherein the reflection attribute comprises s-wave amplitude.

24. A process as in claim 20 wherein the reflection attribute comprises frequency.

25. A process as in claim 24 wherein the reflection attribute comprises p-wave frequency.

26. A process as in claim 24 wherein the reflection attribute comprises s-wave frequency.

27. A process as in claim 20 wherein the reflection attribute comprises phase.

28. A process as in claim 27 wherein the reflection attribute comprises p-wave phase.

29. A process as in claim 27 wherein the reflection attribute comprises s-wave phase.

30. A process as in claim 13 further comprising:
assigning a reflection angle to a plurality of traces and
comparing the reflection attribute variation as a function of reflection angle and azimuth.

31. A process as in claim 30 wherein the reflection attribute comprises amplitude.

32. A process as in claim 31 wherein the reflection attribute comprises p-wave amplitude.

33. A process as in claim 31 wherein the reflection attribute comprises s-wave amplitude.

34. A process as in claim 30 wherein the reflection attribute comprises frequency.

35. A process as in claim 34 wherein the reflection attribute comprises p-wave frequency.

36. A process as in claim 30 wherein the reflection attribute comprises s-wave frequency.

37. A process as in claim 30 wherein the reflection attribute comprises phase.

38. A process as in claim 37 wherein the reflection attribute comprises p-wave phase.

39. A process as in claim 37 wherein the reflection attribute comprises s-wave phase.

40. A process as in claim 13 further comprising:
providing a data set of multiple bins of traces wherein a plurality of traces in the bin have a common reference assigned thereto and wherein the traces represent recordings from shot-receiver pairs having various azimuth angles;
fitting a surface to the data of the traces within the window, in a plurality of the bins;
assigning a coordinate set to a plurality of the surfaces; and
tying the surfaces of adjacent bins.

41. A process as in claim 40, wherein:
said fitting comprises fitting a cone to the date,
wherein the cone has a semi-major axis and a semi-minor axis,
wherein the length of the semi-major axis is dependent upon the gradient of reflection attribute variation in a first direction,
the length of the semi-minor axis has a length dependent upon the gradient of reflection attribute variation in a second direction,
said tying comprises defining a trend of reflection attribute variation between a plurality of bins of traces,
a plurality of traces in any single bin have a common reference with the other traces in the single bin, and
the trend is dependent upon the minor and major axes of a plurality of bins.

42. A process for providing a data set useful for performing analysis of reflection attribute variation among traces in a window of three-dimensional seismic data wherein the traces have a reflection point assigned thereto and wherein the traces represent recordings from shot-receiver pairs having various azimuth angles, the process comprising:
assigning an offset value to a plurality of traces;
fitting a substantially conical surface having a major and a minor axis to the data of the traces within the window, wherein:
the major axis of the cone represents the azimuth direction having the lowest variation in the reflection attribute, and
the minor axis of the cone represents the azimuth direction having the highest variation in the reflection attribute;
assigning a coordinate set to the surface, wherein the coordinate set is related to a survey geometry of the data; and
comparing the reflection attribute variation as a function of offset and azimuth.

43. A process as in claim 42 further comprising:
providing a data set of multiple bins of traces wherein a plurality of traces in the bin have a common reflection point and wherein the traces represent recordings from shot-receiver pairs having various azimuth angles;
fitting a surface to the data of the traces within the window, in a plurality of the bins;
assigning a coordinate set to a plurality of the surfaces; and
tying the surfaces of adjacent bins.

* * * * *